United States Patent [19]

Parr

[11] Patent Number: 4,666,359

[45] Date of Patent: May 19, 1987

[54] TOWABLE DOLLY

[76] Inventor: Willard J. Parr, 230 S. West St., Yerington, Nev. 89477

[21] Appl. No.: 783,006

[22] Filed: Oct. 1, 1985

[51] Int. Cl.$^4$ .............................................. B60D 1/16
[52] U.S. Cl. .................................. 414/485; 280/47.27; 280/63
[58] Field of Search ................................ 414/680, 485; 280/47.27, 63, 405 R

[56] References Cited

U.S. PATENT DOCUMENTS

| | | | |
|---|---|---|---|
| 2,623,760 | 12/1952 | Fornelius | 280/47.27 |
| 3,455,474 | 7/1969 | Truncali | 414/485 |
| 4,044,967 | 8/1977 | Guichon | 414/485 X |
| 4,215,963 | 8/1980 | Doner | 414/485 X |
| 4,295,772 | 10/1981 | Zimmerman | 414/485 X |
| 4,348,143 | 9/1982 | Hedgespeth | 414/485 X |

Primary Examiner—Robert J. Spar
Assistant Examiner—Donald W. Underwood
Attorney, Agent, or Firm—Brown, Martin, Haller & Meador

[57] ABSTRACT

A towable dolly comprises a platform for supporting an object either alone or on a standard dolly, a wheel assembly pivotally secured to the forward end of the platform, and a lifting or tilting assembly for tilting the platform upwardly at its rear end relative to the wheel assembly so that it is raised from the ground in its towing position. A tow bar assembly projects forwardly from the wheel assembly for connection to a standard vehicle tow bar connector.

4 Claims, 5 Drawing Figures

TOWABLE DOLLY

BACKGROUND OF THE INVENTION

The present invention relates to dollies for transporting relatively heavy objects.

A standard dolly normally comprises a wheeled platform with handles for tilting the platform and manually pushing it short distances, for example to and from a vehicle for transporting the object or objects carried on the platform. The carried object, which will normally be relatively heavy, must then be raised from the dolly platform to the vehicle, or vice versa, either manually or with some sort of lifting gear.

SUMMARY OF THE INVENTION

According to the present invention, a towable dolly is provided comprising a platform for supporting a load such as one or more objects or a standard dolly carrying an object, a support frame projecting upwardly from the forward end of the platform, a tow bar assembly projecting forwardly from the dolly for securing to a vehicle for towing the dolly, a wheel assembly pivotally connected to the forward end of the platform, and a lifting or tilting assembly for tilting the platform upwardly at its rear end relative to the wheel assembly. The tilting assembly is arranged to move the platform between a horizontal, ground position in which standard dollies can be wheeled onto the platform, and a raised, tilted up position in which the platform is tilted forward and raised above the ground for towing.

In the preferred embodiment, the tilting assembly comprises a jack or similar lifting device acting between a support frame secured to the front end of the platform and the tow bar assembly. The jack or lifting device preferably acts between the tow bar assembly and a lever arm projecting forwardly from the support frame and pivotally connected to the wheel axle, so that the support platform pivots about the wheel axle.

Thus a heavy object on a standard dolly can be simply wheeled onto the platform of the towable dolly, which has been secured to a suitable towing vehicle, and then be raised or tilted up on the platform for towing. This has the advantage that no manual lifting of the object is required prior to transportation or on arrival at a destination.

BRIEF DESCRIPTION OF THE DRAWINGS

The present invention will be better understood from the following detailed description of a preferred embodiment of the invention, taken in conjunction with the accompanying drawings, in which like reference numerals refer to like parts and in which.

DESCRIPTION OF THE PREFERRED EMBODIMENT

Figure 1:
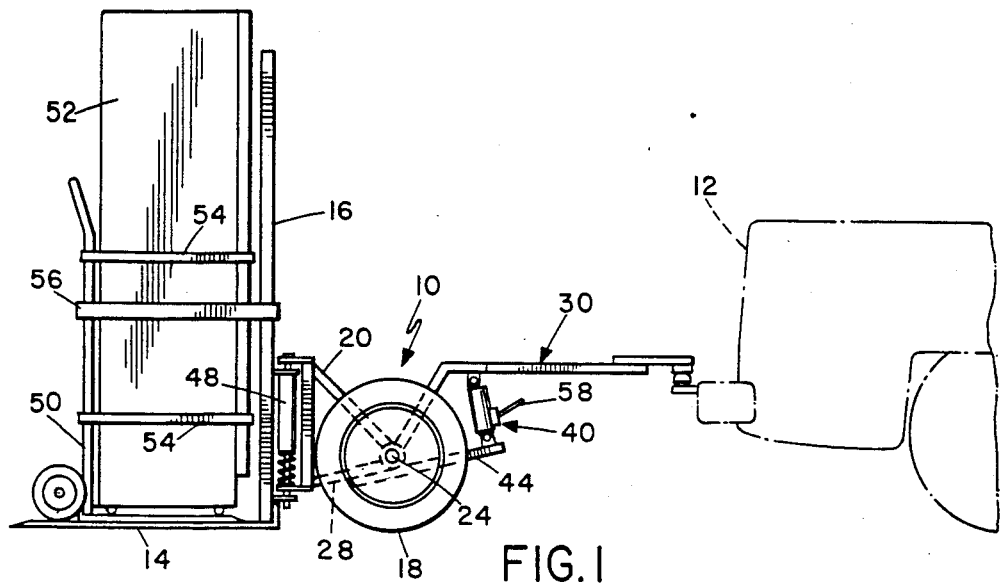
FIG. 1 is a side elevation view of towable dolly with a load in place.

FIG. 1 shows a towable dolly 10 according to a preferred embodiment of the present invention connected for towing to a suitable vehicle 12. As shown in more detail in FIGS. 2 to 5, the dolly basically comprises a flat platform 14, a rigid support frame 16 of any suitable form projecting upwardly from the forward edge of the platform 14, and a wheel assembly 18 pivotally connected to the support frame 16 via V-frame members 20 adjacent each side edge of frame 16. Frame members 20 are secured to sleeve members 22 surrounding wheel axle 24. A cross bar 26 couples the lower members 28 of each V-frame together. The V-frame members are preferably secured to the rear support frame via suitable shock absorber assemblies 48, which may comprise spring as shown, or hydraulic or other shock absorbers.

Figure 2:
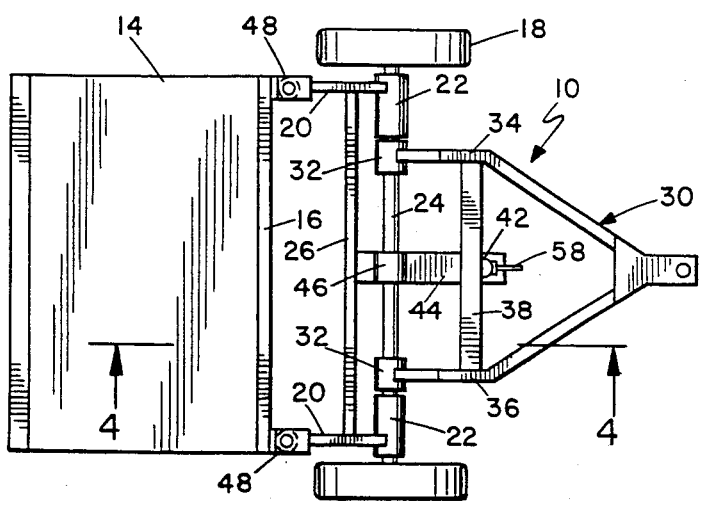
FIG. 2 is a top plan view of the towable dolly.
Figure 3:
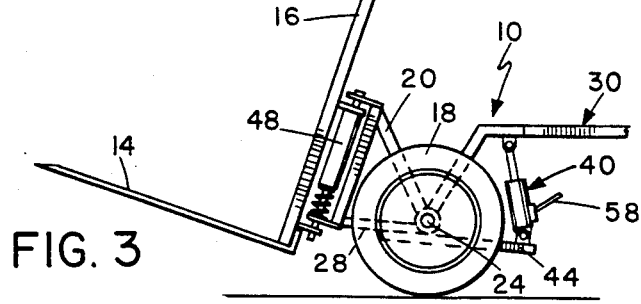
FIG. 3 is a side elevation view with the load platform tilted to the towing position.

A towing yoke 30 which may be of the standard type, projects forwardly from the dolly 10 for connection to a towing vehicle as indicated in FIG. 1. The towing yoke 30 is pivotally secured to the wheel axle 24 via sleeve members 32 through which the axle projects and to which the inner ends of the yoke limbs 34 and 36 are connected. A cross bar 38 connects limbs 34 and 36 together, and a lifting or tilting assembly 40 for raising and lowering the platform 14 acts between the cross bar 38 and the cross bar 26 connecting the V-frame members together, as best shown in FIGS. 2 to 4.

Figure 4:
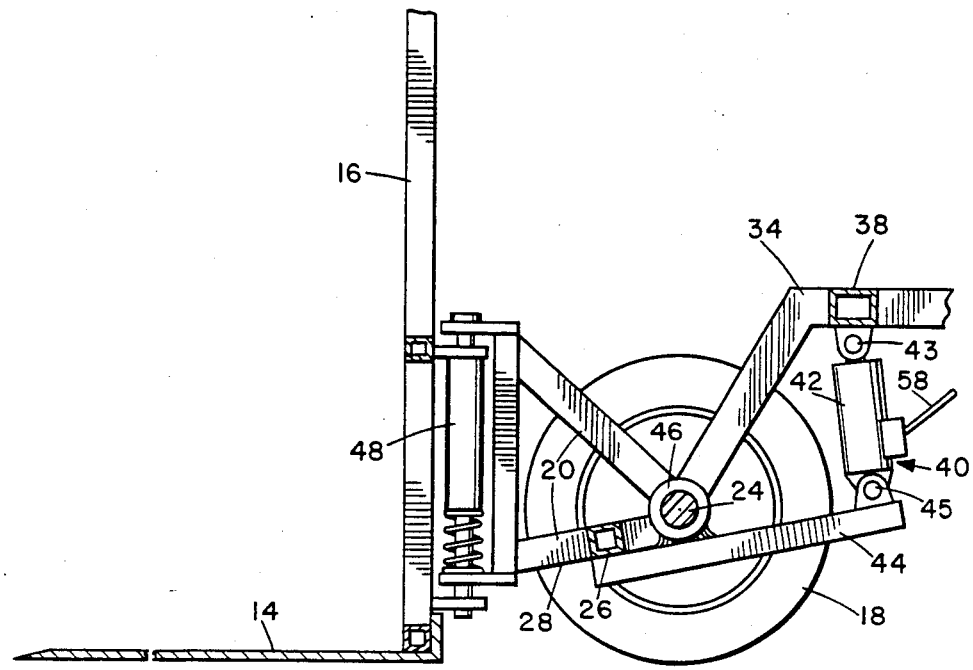
FIG. 4 is an enlarged sectional view taken on line 4—4 of FIG. 2.
Figure 5:
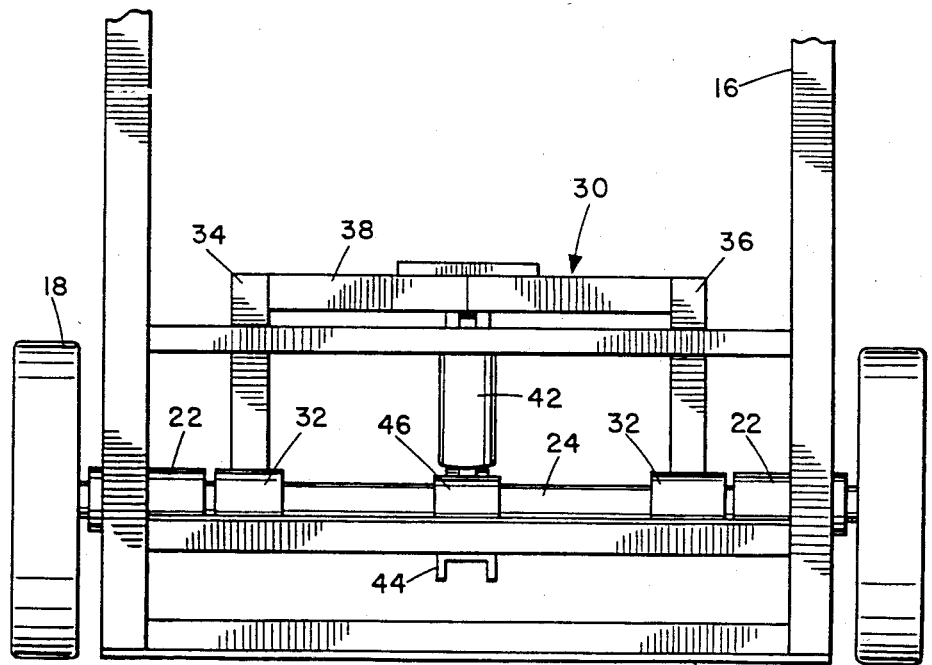
FIG. 5 is a rear elevational view of the dolly structure.

As shown in FIG. 4, the lifting assembly comprises a jack 42 or similar hydraulic or other extendable lifting device. The jack 42 is secured via hinge 43 at its upper end to the towing yoke cross bar 38, and at its lower end via hinge 45 to the free end of a lever arm 44 which is secured to the cross bar 26 at its inner end. The lever arm 44 is pivotally connected to the wheel axle 24 where it crosses it via collar 46.

In order to use the towable dolly to transport loads which may comprise one or more objects either alone or carried on standard dollies, the dolly 10 is first hitched up to the rear of a suitable towing vehicle as shown in FIG. 1, with the jack 42 fully retracted and the platform 14 in its horizontal, ground-engaging position.

At this point, a standard wheeled dolly 50 carrying a relatively heavy object 52 such as a refrigerator, for example, can be wheeled onto the platform 14. The object 52 may be secured to the standard dolly 50 via straps 54 or other fasteners. The dolly 50 and article 52 are then secured to the support frame via strap 56 or other suitable securing devices. Clearly the towable dolly may be used to transport other types of load.

At this point, the jack 42 is activated via handle 58 to move it into its fully extended position as shown in FIG. 3 with the jack acting against cross bar 38 to force the forward end of lever arm 44 downwardly. This acts to lift the cross-bar 26, and thus the V-frame members and support frame 16 upwardly, rotating them about the wheel axle 24 to which the lever arm 44 is pivoted. Thus the support platform 14 is raised, tilting upwardly at its rear end into the tilted towing position shown in FIG. 3 in which it is raised from the ground for towing. At the same time a load carried on the platform is urged forwardly against the support frame 16 to help maintain it in a stable position during transportation.

The procedure is reversed on arrival at a destination to lower the platform 14 back to the ground so that the dolly 50 can be wheeled off to an unloading point.

The towable dolly thus provides a quick and easy way to load objects for towing. Rather than having to physically lift loads into a truck or trailer, they can simply be placed on the ground engaging platform, either directly or by wheeling them on using a standard type of dolly. The dolly platform can then easily be raised into its tilted, towing position in which it is tilted forward so as to both raise the platform from the ground and to help retain the load in a stable position for transportation. The platform may include side supports for the load as well as forward support frame 16. Support frame 16 may comprise a rigid framework of vertical side limbs and horizontal or inclined cross limbs as shown, or may comprise a solid support plate, for example.

The platform 14 will be sufficiently rigid to support the maximum weight of load to be carried by the dolly.

Although a preferred embodiment of the invention has been described above by way of example, it will be understood by those skilled in the field that modifications may be made to the disclosed embodiments which are within the scope of the invention as defined by the appended claims.

I claim:

1. A towable dolly comprising:
   a continuous, flat support surface for supporting a standard pushable dolly;
   a vertical, rigid support frame mounted at the forward end of the support surface;
   fastener means on the support frame for securing a standard pushable dolly carried on the platform to the support frame;
   a frame assembly projecting forwardly from the forward end of the support surface;
   a wheel assembly pivotally secured to the forward end of the frame assembly;
   a tow bar assembly pivotally secured to the wheel assembly for securing to a towing point on a vehicle for towing the dolly;
   a forwardly projecting lever arm secured to the frame assembly at one end and pivotally connected to the wheel assembly at an intermediate point in its length, the lever arm having a free end projecting forwardly of said wheel assembly; and
   a lifting device acting between said tow bar assembly and the free end of said lever arm for urging the platform between a horizontal, ground position and a raised, tilted position in which the rear end of the platform is tilted upwardly relative to the wheel assembly.

2. The towable dolly as claimed in claim 1, in which said tow bar assembly includes a horizontal cross member, and said lifting device comprises a jack acting between said cross member and said lever arm, said jack comprising extendable means for moving between a retracted position and an extended position in which said lever arm is urged downwards relative to said cross member so that the rear end of said platform is tilted upwards.

3. The towable dolly as claimed in claim 2, in which the frame assembly includes a horizontal cross member and the forwardly projecting lever arm is secured to said frame assembly cross member.

4. The towable dolly as claimed in claim 1, including a shock absorber assembly for securing the wheel assembly to the platform.

* * * * *